Jan. 26, 1965   F. R. GRUNER   3,167,508
LAUNDRY MACHINES
Filed Dec. 22, 1961

INVENTOR.
FREDERICK R. GRUNER
BY
Robertson and Smythe
ATTORNEYS.

3,167,508
LAUNDRY MACHINES
Frederick R. Gruner, Moline, Ill., assignor to Ametek, Inc., New York, N.Y., a corporation of Delaware
Filed Dec. 22, 1961, Ser. No. 161,663
3 Claims. (Cl. 210—250)

The present invention relates to laundry machines of the washer extractor type, and particularly to a new and improved vibration absorbing mounting means therefor.

Problems arise in the use of washer extractors, particularly those of commercial size, when used on floors of a building substantially above ground level where the building floor must absorb the vibrations incident to unbalanced loads within the centrifugal extractor.

Shock absorbing mountings have been proposed to overcome these difficulties but in the main, they are complicated structures that are relatively expensive to produce and usually require auxiliary shock absorbing devices.

The principal object of the present invention is to provide a washer extractor with a simple, inexpensive vibration absorbing mounting that will overcome the difficulties outlined above and require no auxiliary shock absorbing equipment.

Another object of the invention is to provide such a mounting that will have a long life and be free from failures.

Still another object of the invention is to provide such a mounting having the ability to absorb low-frequency vibrations.

Still another object of the invention is to provide such a mounting in which heavy-duty, shear-type rubber mountings are employed.

In one aspect of the invention, a washer extractor may comprise a housing or frame that supports interiorly a basket for rotation about a horizontal axis. A rectangular base plate may be provided for the housing, and it may include at each corner thereof a shear-type rubber mounting rigidly fixed thereto.

In another aspect of the invention, the shear plane of the rubber mounting may be parallel to the plane of rotation of the rotatable basket, or at right angles to the rotational axis of the basket.

In still another aspect of the invention, a heavy inertia member may be mounted between the bottom of the washer extractor and the rubber mountings to reduce the amplitude of vibrations to be absorbed by the mountings.

The above, other objects and novel features of the invention will become apparent from the following specification and accompanying drawing which is merely exemplary.

Figure 4:
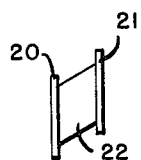
FIG. 4 is a view of a shear-type rubber mounting.
Figure 3:
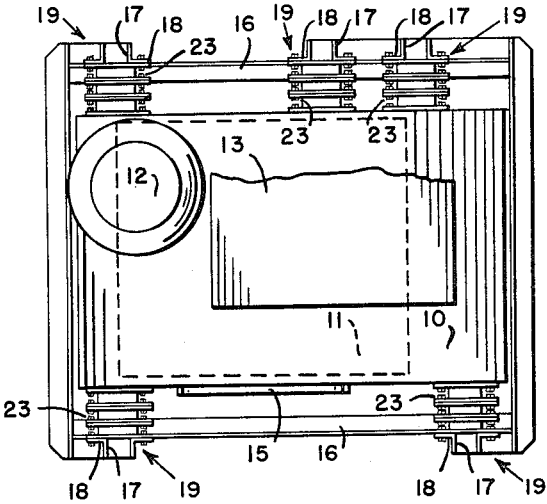
FIG. 3 is a top plan view of the machine shown in FIGS. 1 and 2.
Figure 2:
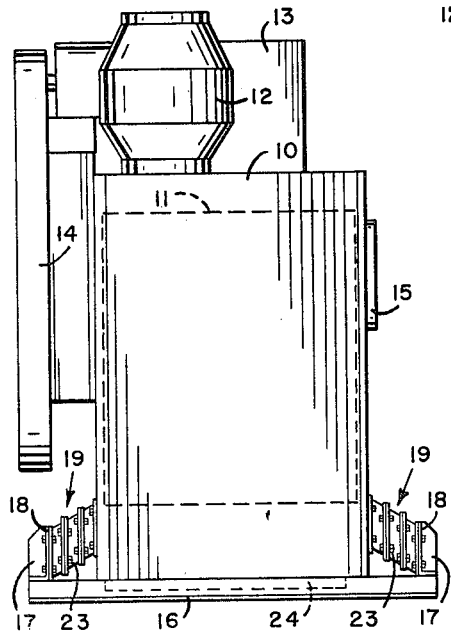
FIG. 2 is a side elevational view of the machine shown in FIG. 1.
Figure 1:
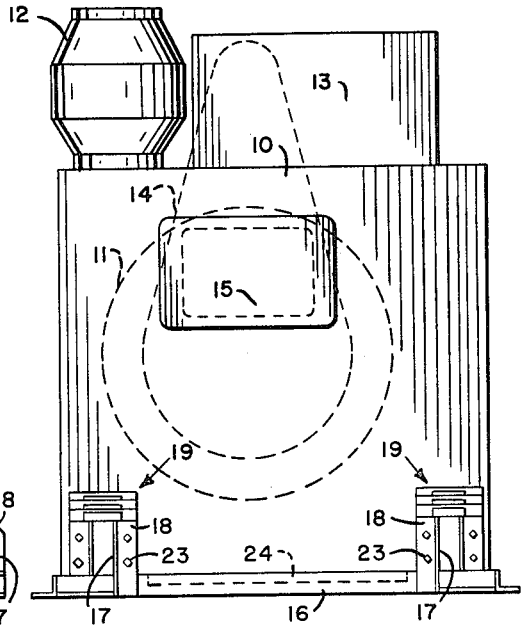
FIG. 1 is a front elevational view of a laundry machine to which the principles of the invention have been applied.

Referring to the drawing, the principles of the invention are shown as applied to a washer extractor including a housing 10 within which may be mounted a basket 11 rotatably mounted on a horizontal axis. A fan 12 may be mounted on the housing 10 for withdrawing vapor from within the housing. A motor 13 may drive the basket 11 through a belting system 14. A door 15 may be provided for inserting materials to be laundered in the basket 11.

A base plate 16 of generally rectangular shape may be provided at each of its corners with an upstanding plate 17. The location of the plates 17 is such that their mounting faces 18 along each of two parallel edges of base 16 are located within a plane that is parallel to the plane of rotation of the basket 11, or at right angles to the rotational axis of the basket 11.

Shear-type rubber mounting members 19 may be mounted between the plates 17 and the sides of the housing 10. Referring to FIG. 4, these mounting members may comprise parallel spaced, metallic plates 20 and 21 between which is bonded a body of rubber 22. The plates 20, 21 may be displaced so that they are somewhat out of alignment, but still in parallel relation, before the rubber body 22 is vulcanized or otherwise fixed thereto, so that when a load is applied to the one plate attached thereto, it will tend to move it toward alignment with the other plate which comprises the supporting plate. The shear-type of rubber mounting that has been found to be particularly advantageous is that which is sold by the United States Rubber Company under the designation of No. 1103A. Additionally, during assembly, the shear mountings are preferably so arranged that the rubber is placed slightly in compression to prevent any failures in the bond of the rubber to the metal plates due to dynamic loading conditions.

Although one or more of the rubber mountings may be employed between the plates 17 and the housing 10, in the embodiment disclosed, three such mountings are shown in series relation, bolted together and fastened to the plates 17 and housing 10 by bolts 23. It is to be noted that with the rubber mountings as disclosed, their shear planes are parallel to the plane of rotation of the rotatable basket 11, whereby they will have the maximum vibration absorbing characteristics.

Because of the location of the motor 13 and fan 12, there may be an unequal loading on the rubber mountings 19. This could produce separate critical speeds for the front and rear mountings. Since the natural period of vibration of the assembly depends upon the mass and spring constant, it is preferred to locate one or more additional rubber mountings 19 along the rear of the extractor between the two corner ones and to vary their locations in order to get substantially the same deflection in each mounting of the apparatus within its shear plane which latter, as previously described, is parallel to the plane of rotation of basket 11. Such an arrangement provides a single natural frequency for the entire apparatus.

In order to keep the amplitude of the vibrations, due to unbalanced loads, within a reasonable limit to provide long life of the rubber mountings, a heavy plate providing an inertia member 24 may be attached to the bottom of the housing 10.

Because of the inherent damping qualities of rubber, no auxiliary conventional shock absorbers or damping devices are required.

Although the various features of the new and improved mounting for washer extractors have been shown and described in detail to fully disclose one embodiment of the invention, it will be evident that changes may be made in such details and certain features may be used without others without departing from the principles of the invention.

What is claimed is:

1. In a washer extractor, a housing; a basket mounted in said housing for rotation about a horizontal axis; a supporting base plate for said housing of substantially rectangular form; mounting plates at each corner of said supporting base plate having mounting faces that lie in planes along parallel edges of said base plate that are transverse to the axis of rotation of said basket; and a plurality of series arranged shear-type rubber mountings, each comprising parallel, misaligned metal plates having a body of rubber therebetween and integrally joined thereto, mounted between said mounting faces and said housing such that the shear planes of said rubber mountings are parallel to the plane of rotation of said basket.

2. In a washer extractor, a housing; a basket mounted in said housing for rotation about a horizontal axis; a supporting base plate for said housing of substantially rectangular form; mounting plates at each corner of said supporting base plate having mounting faces that lie in planes along parallel edges of said base plate that are transverse to the axis of rotation of said basket; a plurality of series arranged shear-type rubber mountings, each comprising parallel, misaligned metal plates having a body of rubber therebetween and integrally joined thereto, mounted between said mounting faces and said housing such that the shear planes of said rubber mountings are parallel to the plane of rotation of said basket; and a heavy inertia member fixed to the bottom of said housing.

3. In a washer extractor, a housing; a basket mounted in said housing for rotation about a horizontal axis; a supporting base plate for said housing of substantially rectangular form; mounting plates at each corner of said supporting base plate having mounting faces that lie in vertical planes along parallel edges of said base plate that are transverse to the axis of rotation of said basket; and a plurality of series arranged shear-type rubber mountings, each comprising parallel, generally vertically disposed spaced plates having a body of rubber therebetween and joined thereto, mounted between said mounting faces and said housing such that the shear planes of said rubber mountings are parallel to the plane of rotation of said basket.

References Cited in the file of this patent
UNITED STATES PATENTS

| | | |
|---|---|---|
| 2,352,362 | Bassett | June 27, 1944 |
| 2,522,242 | Wagner | Sept. 12, 1950 |
| 2,637,514 | O'Connor | May 5, 1953 |
| 2,655,005 | Kinneman | Oct. 13, 1953 |
| 2,676,774 | Hirst | Apr. 27, 1954 |
| 2,828,957 | Hirst | Apr. 1, 1958 |

FOREIGN PATENTS

| | | |
|---|---|---|
| 553,793 | Great Britain | June 7, 1943 |
| 874,769 | Great Britain | Aug. 10, 1961 |

OTHER REFERENCES

German printed application 1,057,979, May 21, 1959.